June 17, 1924.
H. A. RASMUSSEN
SPARK PLUG
Filed Sept. 29, 1920
1,497,985
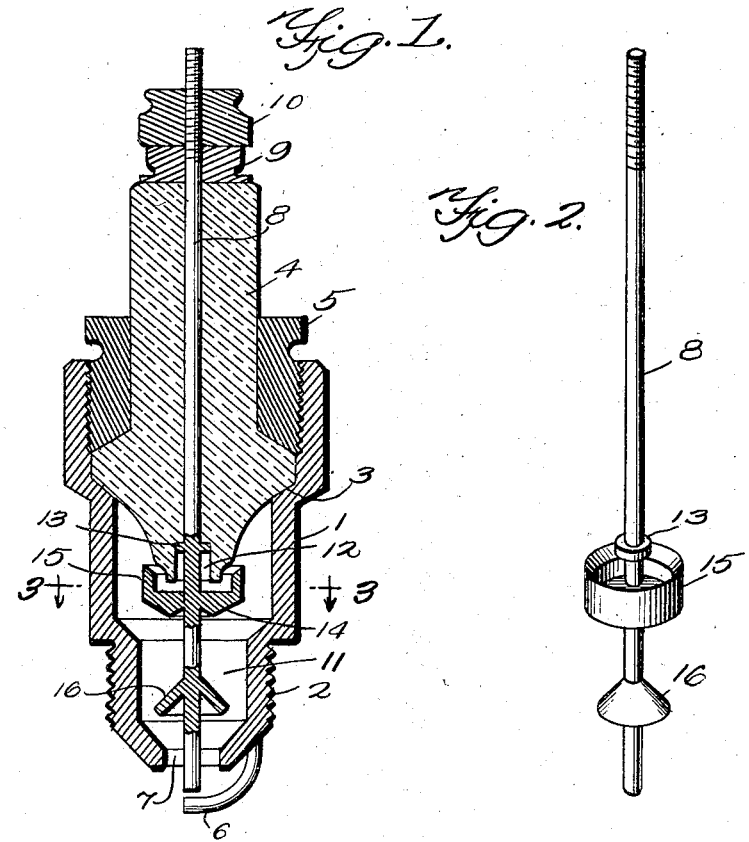
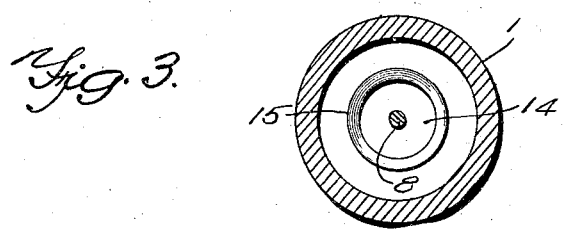
Inventor
Harry A. Rasmussen
By
Attorney Patented June 17, 1924.

1,497,985

UNITED STATES PATENT OFFICE.

HARRY A. RASMUSSEN, OF MOLINE, ILLINOIS.

SPARK PLUG.

Application filed September 29, 1920. Serial No. 413,479.

*To all whom it may concern:*

Be it known that I, HARRY A. RASMUSSEN, a citizen of the United States, residing at Moline, in the county of Rock Island and State of Illinois, have invented certain new and useful Improvements in Spark Plugs, of which the following is a specification.

This invention relates to spark plugs, and it comprises an outer shell, insulation of porcelain or other suitable material arranged within the shell, and a central electrode arranged with said insulation and projecting below the lower end of the insulation, said electrode being provided with a cup-like member surrounding the bottom of the insulation, and a baffle arranged below said cup-like member and spaced therefrom.

One of the most serious objections to spark plugs as at present manufactured is the tendency of carbon, or oil and dirt, to accumulate in the firing chamber at the bottom of the plug and settle on the surface of the insulation, causing shortcircuiting. When considerable carbon collects on the insulation and this carbon is mixed with oil, it forms a conductor between the central electrode and the outer shell which permits the current to pass from the central electrode to the outer shell without passing the sparking gap and igniting the gas.

In the present invention, I have produced a foulless spark plug wherein the firing chamber at the bottom of the plug is made considerably larger to aid ignition and wherein the central electrode is provided with a substantially conical shape baffle to prevent entrance of carbon and dirt into the firing chamber. The lower end of the insulation which is a point where the greatest accumulation of carbon and other foreign substances generally occur, is surrounded by a cup shaped member and thereby protected so as to eliminate deposits of carbon.

In the accompanying drawings, I have shown one embodiment of the invention. In this showing, Figure 1 is a central vertical sectional view.

Figure 2 is a perspective view of the central electrode, and

Figure 3 is a horizontal sectional view on the line 3—3 of Figure 1.

Referring to the drawings, the reference numeral 1 designates the outer shell which is provided with the usual screw threaded portion 2, whereby the plug is inserted in the cylinder. The top of the shell is slightly enlarged forming a shoulder 3 which receives the insulation 4 of porcelain or other suitable material and prevents displacement thereof in a downward direction. A nut 5 is adapted to maintain the porcelain insulation in position in the usual manner. An outer electrode 6 is arranged on the bottom of the shell near the openings 7. The porcelain insulation is adapted to receive the central electrode 8 which is screw threaded at its upper end for the reception of a nut 9 and a jam nut 10. The lower end of the central electrode extends through the firing chamber 11 and terminates at a point near the outer electrode. The bottom of the insulation is provided with an enlarged opening 12 for the reception of a collar 13 arranged on the electrode. The use of the collar retains the electrode in position, and the spacing arrangement of the electrode and insulation below the collar helps to eliminate deposits of carbon and other foreign matter. Beneath the insulation, the electrode is provided with a plate 14 having vertical flanges 15 forming a cup-like member surrounding the lower end of the insulation. Between the cup-like member and the lower end of the electrode, there is provided a substantially conical shaped baffle plate 16 secured to the electrode.

The construction heretofore described is a very efficient type of spark plug in that the point where the accumulation of carbon and other foreign matter is generally greatest, the point where the electrode enters the insulation, is protected by the cup-like member surrounding it and the introduction of carbon and other foreign matter into the firing chamber is practically eliminated by the baffle plate 16.

It is to be understood that while I have described the preferred embodiment of invention, various changes in the shape, size, and arrangement of parts may be resorted to without departing from the spirit of the invention or the scope of the subjoined claim.

Having thus described my invention, I claim:

A spark plug comprising an outer shell, the lower end of said shell being provided with a relatively small opening, a body of insulation arranged in the upper portion of said shell, said insulation being provided with a central opening having an enlargement at its lower end, an electrode arranged in said opening, a collar carried by said electrode and arranged in said enlargement, a cup shaped member arranged on said electrode and surrounding the lower end of said insulation, and a conical shaped baffle plate secured to said electrode between said cup shaped member and said opening, said baffle plate being of larger diameter than said opening.

In testimony whereof I affix my signature in presence of two witnesses.

HARRY A. RASMUSSEN.

Witnesses:
ALBERT H. RASMUSSEN,
ELENORA V. RASMUSSEN.